United States Patent [19]
Rao et al.

[11] Patent Number: 4,910,104
[45] Date of Patent: Mar. 20, 1990

[54] DEFERRED ACTUATED BATTERY

[75] Inventors: Bhaskara M. L. Rao, Flemington; Robert P. Hamlen, Bernardsville, both of N.J.

[73] Assignee: Alupower, Inc., Warren, N.J.

[21] Appl. No.: 330,414

[22] Filed: Mar. 29, 1989

[51] Int. Cl.⁴ ............................................. H01M 6/48
[52] U.S. Cl. .................................... 429/67; 429/118; 429/210
[58] Field of Search ............... 429/210, 119, 118, 81, 429/67, 70, 81, 72, 51, 52

[56] References Cited

U.S. PATENT DOCUMENTS

| | | | |
|---|---|---|---|
| 3,432,350 | 3/1969 | Wilson | 429/119 |
| 3,462,309 | 8/1969 | Wilson | 429/119 |
| 3,966,497 | 6/1976 | Honer | 429/119 |
| 4,091,184 | 5/1978 | Erisman et al. | 429/210 X |
| 4,152,492 | 5/1979 | McCartney et al. | 429/118 X |
| 4,185,143 | 1/1980 | Birt et al. | 429/119 |
| 4,626,481 | 12/1986 | Wilson | 429/210 X |
| 4,731,305 | 3/1988 | Goebel et al. | 429/210 X |
| 4,822,698 | 4/1989 | Jackowitz et al. | 429/118 X |

Primary Examiner—Anthony Skapars
Attorney, Agent, or Firm—Louis E. Marn

[57] ABSTRACT

There is disclosed a deferred actuated battery assembly comprised of a plurality of bipolar electrodes disposed between an inert cathode current collector acting as a hydrogen electrode and an anode plate formed of a material selected from the group consisting of aluminum, magnesium, aluminum alloys, magnesium alloys and mixtures thereof and configured for electrolyte flow therebetween.

10 Claims, 2 Drawing Sheets

DEFERRED ACTUATED BATTERY

BACKGROUND OF THE INVENTION (1) Field of the Invention

This invention relates to deferred actuated batteries, and more particularly to an improved deferred actuated battery including bipolar electrodes.

(2) Description of the Prior Art

Battery requirements for marine data systems vary from a few milliwatts for CMOS instrumentation to several tens of kilowatts for the operation of a mini autonomous underwater vehicle (AUV). Nonaqueous lithium cells and zinc-based primary cells, as well as nickel-cadmium and lead-acid batteries, are currently used. Safety and the corrosive nature of the electrolyte and/or some cathode materials used in such power sources dictate that cells and batteries be well sealed to prevent leakage and/or rupture during storage and use. Lithium batteries use hermetic seals with safety vents and a fuse. Alkaline cells are rendered leakproof by suitable double crimp joints. Lead-acid cells use a gelled electrolyte to prevent spillage of the electrolyte. Such techniques have minimized the hazards of handling and use, however at the expense of costs. Sealed cells require a "pressure hull" enclosure for deep sea application and thus use of a pressure hull significantly reduces energy density and concomitantly increases usage cost. Other types of power cells used in undersea applications are water activated magnesium batteries with a bipolar configuration as open cells. A magnesium anode and a metal halide-based cathode allows the use of sea water as the electrolyte and do not require a pressure hull housing for deep sea applications.

Deferred actuated batteries, such as silver chloride-magnesium batteries using seawater as an electrolyte have been used for years, and are expensive being based upon the use of a precious metal, i.e. silver. Subsequent developments centered on non-silver containing sea water actuated batteries, e.g. U.S. Pat. Nos. 3,432,350 and 3,462,309 to Wilson based upon a magnesium anode-inert metal cathode type of a serial flow type configuration provided limited usages as well as extensive electrical circuitry including tunnel diode inverters t provide useful voltage levels. In U.S. Pat. No. 4,185,143 to Brit et al., there is disclosed a water actuated battery based upon metal/organo halogen couples having anode and cathode members of planar form with a porous insulating member sandwiched therebetween where the cell is provided with electrolyte access passageways extending around the periphery of the cathode member whereby electrolyte flowing in the passageway access the whole peripheral edge region of the cathode reactant material.

OBJECTS OF THE PRESENT INVENTION

An object of the present invention is to provide an improved deferred actuated battery of simple construction and of increased capacity.

Another object of the present invention is to provide an improved deferred actuated battery of simple construction and of longer operating life.

Still another object of the present invention is to provide an improved deferred actuated battery of high energy density.

A further object of the present invention is to provide an improved deferred actuated battery of increased shelf life.

Yet another object of the present invention is to provide an improved deferred actuated battery readily useable in a facile manner without complicated ancillary equipment.

SUMMARY OF THE INVENTION

These and other objects of the present invention are achieved by a deferred actuated battery assembly comprised of a plurality of bipolar electrodes disposed between an inert cathode current collector acting as a hydrogen electrode and an anode plate formed of a material selected from the group consisting of aluminum, magnesium, aluminum alloys, magnesium alloys and mixtures thereof and configured for electrolyte flow therebetween.

BRIEF DESCRIPTION OF THE DRAWINGS

Further objects and advantages of the present invention will become apparent from the following detailed description when taken with the accompanying drawing, wherein.

DETAILED DESCRIPTION OF THE INVENTION

Figure 1:
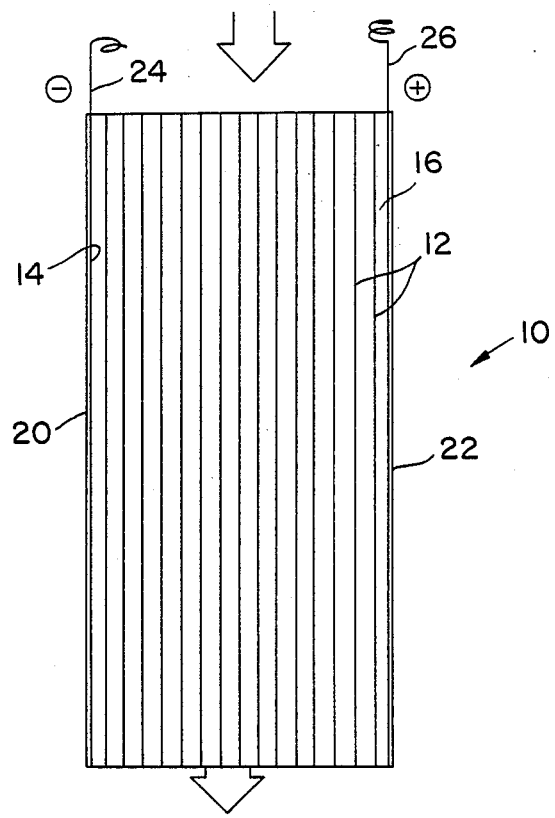
FIG. 1 is a cross-sectional view of a battery assembly of the present invention.
Figure 2:
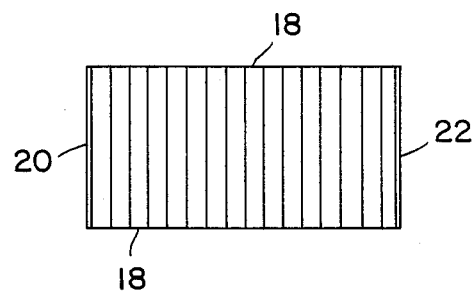
FIG. 2 is a top view of the embodiment of FIG. 1.
Figure 3:
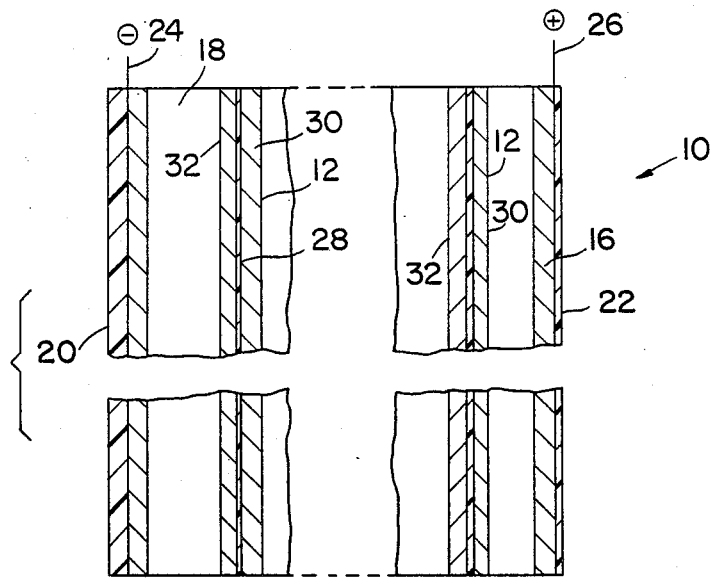
FIG. 3 is an enlarged partial cross-sectional view of the battery assembly of FIG. 1.

Referring now to the drawings and particularly FIGS. 1 to 3, there is illustrated a battery assembly, generally indicated as 10, comprised of a plurality of bipolar electrodes 12 disposed between an anode plate 14 and an inert cathode current collector plate 16 and held in parallelledly-disposed spaced-apart relationship by side walls 18 formed of a dielectric material, such as any conventional plastic material suitable for battery usage. Generally, spacing between adjacent bipolar electrodes 16 is not greater than about 0.5 inches to provide an adequate internally-connected series configuration. There being no top and bottom wall member, the battery assembly 10 permits the introduction as well as flow-through of an electrolyte from top to bottom, or alternately from bottom-to-top, etc. through the spaces between the component parts thereof, as more fully 10 hereinafter described. The anode and cathode plates 14 and 16 are coated on an outer surface thereof with a dielectric material such as that of the side walls 18 forming anode end wall 20 and cathode end wall 22. The anode plate 14 and cathode plate 16 are provided with connector elements 20 and 22 for connection to a suitable user article or assembly, such as a light, motor, or the like.

Figure 4:
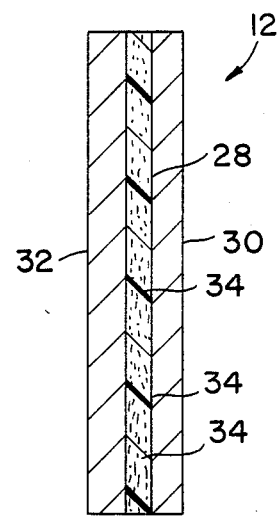
FIG. 4 is still further enlarged cross-sectional view of a bipolar electrode.

As disclosed in copending application Ser. No. 07/321,896, filed Mar. 10, 1989, incorporated herein by reference, each bipolar electrode 12, referring specifically to FIG. 4, is comprised of electrically conductive laminating film or layer 28 laminated between an electronegative sheet or film of material 30 and an electropositive sheet or film of material 32. The electrically conductive laminating film or layer 12 is formed of a suitable plastic material, such as butyl or acrylic films of less than about 5 mils thickness. The butyl or acrylic film or layer 28 is formed with a dispersion of electrically conductive particles 34 in an amount sufficient to provide a volume resistivity of less than about 0.5 ohm cm. Such electrically conductive particles are exemplified by silver coated nickel particles of a particle size distribution of from 0.1 to 25 μm.

The anode plate 14 as well as the electronegative sheet or film 30 are formed of an aqueous stable material selected from the group consisting of aluminum, magnesium, aluminum alloys, magnesium alloys and mixtures thereof. The dimension including thickness of the anode plate 14 and the electronegative film or layer of the bipolar electrodes 12 are a function of capacity, e.g. 2 mil foil providing for low capacity (AH 1 sq. in) electrodes or a thickness approaching one inch for high capacity.

The cathode current collector plate 16 and electropositive current collector sheet or film 32 are formed of an inert 10 conducting substrate, such as nickel, carbon, silver, lead and the like having a coating of a catalyst, such as palladium, platinum-palladium, iron or other low hydrogen overvoltage metal for effective operation as a hydrogen electrode, i.e. water-hydrogen. The cathode current collector plate 16 and electropositive current collector film or sheet 32 may be of a thickness of from 0.5 to 5 mils. It is to be noted that the cathode current collector plate 16 or foil 32 is inert to be distinguished from the metal salt cathodes as used in the heretofore salt water actuated batteries, as disclosed in the aforementioned U.S. Pat. No. 4,007,316 to Koontz.

Typical electrolytes include salt water, such as sea water from the ocean or any liquid capable of conducting current. In operation, e.g. with salt water (not shown) being passed through the spaces between the bipolar electrodes 12, anode 14 and cathode 16 of the battery 10, the following equations represent the reactions:

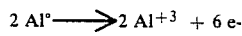
$$2 \text{ Al}° \longrightarrow 2 \text{ Al}^{+3} + 6 \text{ e-} \quad (1)$$

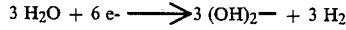
$$3 \text{ H}_2\text{O} + 6 \text{ e-} \longrightarrow 3 (\text{OH})_2^- + 3 \text{ H}_2 \quad (2)$$

$$2 \text{ Al}° + 3 \text{ H}_2\text{O} \longrightarrow 2 \text{ Al}(\text{OH})_3 + 3 \text{ H}_2 \quad (3)$$

Power density of the battery 10 of the present invention may be increased by: (i) decreasing the anode-cathode gap (reduces IR loss), and (ii) using improved catalysts in the cathode plate or film (i.e. to reduce the hydrogen overpotential). Cell voltage may be increased by increasing the number of bipolar electrodes in the cell stack as known to one skilled in the art. Additionally, overall current from a battery 10 may be increased by increasing the area of the electrodes and thus the battery of the present invention is amenable to simple scaling to desired or preselect performance levels or requirements.

In a preferred embodiment of the present invention, there is contemplated a deferred actuated battery assembly, i.e. capable of activation by the introduction of electrolyte, such 15 as sea water into the spaces of the battery 10. Under a load condition, aluminum hydroxide is formed which builds-up and would eventually cause the voltate level to drop to zero in a stagnant pool of electrolyte. Thus the requirement for a flow through of electrolyte, such as by natural forces, during passage through or by a force circulating system, referring to FIG. 5.

Figure 5:
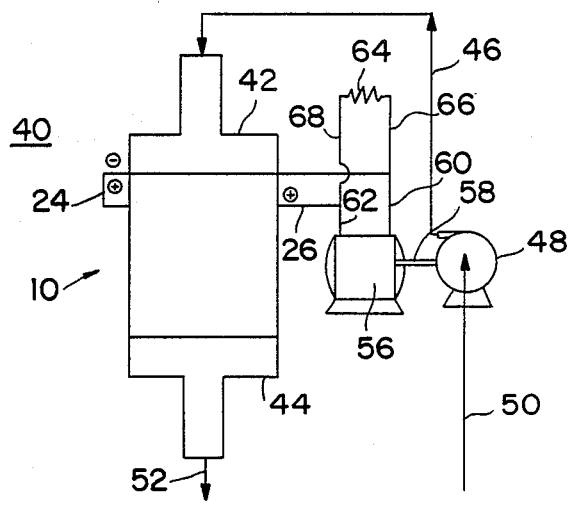
FIG. 5 is a schematic flow diagram of a system using the battery assembly of the present invention.

In FIG. 5, there is illustrated an integral battery assembly, generally indicated as 40, including the battery assembly 10, a fluid distribution manifold assembly 42 and a fluid collection manifold assembly 44 providing for electrolyte fluid flow through the spaces of the battery 10. The distribution manifold assembly 42 is in electrolyte fluid flow communication via line 46 with a pump 48 connected on a suction side by line 50 with a source of electrolyte such as sea water. The collection manifold assembly 44 provide for uniform flow through the spaces defined by the bipolar electrodes and the respective anode and cathode plates 14 and 16 for collection and discharge of the electrolyte via line 52. The anode and cathode plates 14 and 16, of the battery 10 are connected by conductors 24 and 26 to a motor 56 including a shaft 58 via conductors 60 and 62 for driving the pump 48 and to a load 64 via lines 66 and 68, respectively. Thus, the integral battery assembly of FIG. 5 may be integrally packaged for subsequent use an activation by the addition of an electrolyte into tee battery assembly 10 and accompanying fluid lines 46 and 50 by pump 48 as well as the related conduits. In this context, operation of the pump 48 may be continuous or intermittant as a function of electric usage requirements.

EXAMPLES OF THE INVENTION

Operation of the process and apparatus of the present invention is illustrated by the following bipolar electrode examples which are intended to b merely illustrative and the invention is not to be regarded as limited thereto.

The following Table I is a comparison of the battery assembly 10 of the present invention based on a 3% sodium chloride electrolyte at 20° C.

TABLE I

| Battery volts (V) | Rating Amps (A) | Designed Amp-hours (AH) | Energy Density | |
|---|---|---|---|---|
| | | | (*) WH/Kg | WH/liter |
| 1.5 | 0.2 | 30 AH | 210 | 270 |
| 4.5 V | 0.75 A | 100 AH | 455 | 900 |
| 6 V | 1.75 A | 55 AH | 416 | 313 |
| 6 V | 8.0 A | 200 AH | 279 | 222 |
| Lithium Battery | | | | |
| | Li/SOCl$_2$ | 0.5–15 KWH | 300 | 650 |
| | Li/SO$_2$ | 30 AH | 280 | 440 |

*battery WH/Kg is based on dry weight as sea water is the electrolyte.

Advantages of the battery assembly of the present invention compared with heretofore available salt water actuated batteries include:

1. Elimination of cathode salts;
2. A service life of a function of an amount of anodic material;
3. The absence of a cathode active material permits increased shelf life particularly under high humidity storage conditions;
4. No self-discharge or deterioration of cell performance resulting from the solubility of a cathode salt; and
5. No increased weight, volume or cost associated with the use of cathode salt since the cathode plate is an inert current collector.

The battery of the resent invention is well suited for a variety of civilian (off-shore technology, commercial and recreational boating and fishing) and military marine applications. For example, the batter can be used as an electric power source for sonobuoys or other remote warning, sensing, monitoring and data transmission and repeater devices, for operating untethered diver assist equipment, such as lighting, cameras, electrical tools and the like. Larger version of battery assembly may be used for electrical propulsion of underwater vehicles.

While the present invention has been described in connection with an exemplary embodiment thereof, it will be understood that many modifications will be apparent to those of ordinary skill in the art; and that this application is intended to cover any adaptations of variations thereof. Therefore, it is manifestly intended that this invention be only limited by the claims and the equivalents thereof.

What is claimed is:

1. A battery assembly comprised of:
an anode plate formed of a material selected from the group consisting of aluminum, magnesium, aluminum alloys, magnesium alloys and mixtures thereof;
an inert cathode current collector plate functioning as a hydrogen electrode;
a plurality of spaced-apart bipolar electrodes disposed between and spaced-apart from said anode plate and said inert cathode plate, each of said bipolar electrodes including an anode layer formed of a material selected from aluminum, magnesium, aluminum alloys, magnesium alloys and mixtures thereof and an inert cathode current collector layer functioning as a hydrogen electrode and laminated to said anode layer, said battery assembly having an inlet and outlet for electrolyte for electrolyte fluid flow between said anode plate, said bipolar electrodes and said cathode plates.

2. The battery assembly as defined in claim 1 wherein aid bipolar electrodes are spaced-apart a distance of less than about 0.5 inches.

3. The battery assembly as defined in claim 1 wherein said anode layer and cathode layer are laminated to a conductive layer having a volume resistivity of at least 0.5 ohm cm.

4. The battery assembly as defined in claim 3 wherein said volume resistivity is not greater than 100 ohm cm.

5. The battery assembly as defined in claim 1 wherein said anode plate, said bipolar electrodes and said cathode plate are held in spaced-apart relationship by side walls defining passages therebetween for electrolyte flow.

6. A battery assembly system, which comprises:
a battery assembly comprised of an anode plate formed of a material selected from the group consisting of aluminum, magnesium, aluminum alloys, magnesium alloys and mixtures thereof; an inert cathode current collector plate functioning as a hydrogen electrode and a plurality o space-apart bipolar electrodes disposed between and spaced-apart from said anode plate and said inert cathode plates, each of said bipolar electrodes including an anode layer formed of a material selected from aluminum, magnesium, aluminum alloys, magnesium alloys and mixtures thereof and an inert cathode current collector layer functioning as a hydrogen electrode and laminated to said anode layer;
said battery assembly including side and end walls defining open ends thereof; and
means for passing an electrolyte through said battery assembly.

7. The battery assembly system as defined in claim 6 wherein said means for passing said electrolyte through said battery assembly includes a pump.

8. The battery assembly system as defined in claim 7 wherein said pump is driven by a motor connected to said battery assembly.

9. The battery assembly system as defined in claim 6 wherein one open end of said battery assembly is provided with a manifold for introducing said electrolyte into said battery assembly.

10. The battery assembly system as defined in claim 9 wherein another open end of said battery assembly is provided with a manifold to ensure uniform flow of electrolyte through said battery assembly.

* * * * *

UNITED STATES PATENT AND TRADEMARK OFFICE
CERTIFICATE OF CORRECTION

PATENT NO. : 4,910,104

DATED : MARCH 20, 1990

INVENTOR(S) : BHASKARA M.L. RAO and ROBERT P. HAMLEN

It is certified that error appears in the above-identified patent and that said Letters Patent is hereby corrected as shown below:

```
Column 3, line 63, delete "15".

and line 22, delete "tee", and insert -- the --.
```

Signed and Sealed this

Tenth Day of September, 1991

Attest:

HARRY F. MANBECK, JR.

*Attesting Officer*   *Commissioner of Patents and Trademarks*